United States Patent

Oehme et al.

[11] Patent Number: 5,187,691
[45] Date of Patent: Feb. 16, 1993

[54] UNDERWATER SIGNALING DEVICE AND METHOD

[76] Inventors: William J. Oehme, dB Products North, 929 Cypress Dr., Delray Beach, Fla. 33483; Donald Ammann, dB Products South, 4060 NW. 8th Ter., Oakland Park, Fla. 33309

[21] Appl. No.: 813,505
[22] Filed: Dec. 26, 1991
[51] Int. Cl.$^5$ .............................. H04B 11/00
[52] U.S. Cl. ...................... 367/134; 367/142
[58] Field of Search ............ 367/134, 131, 142, 141, 367/140, 137

[56] References Cited

U.S. PATENT DOCUMENTS

| | | | |
|---|---|---|---|
| 3,562,451 | 2/1971 | Mullen, Jr. et al. | 367/134 |
| 3,906,884 | 3/1974 | Gould | 367/142 |
| 4,509,151 | 4/1985 | Anderson | 367/131 |
| 4,635,242 | 1/1987 | Hart | 367/134 |
| 5,047,990 | 9/1991 | Gafos et al. | 367/134 |

Primary Examiner—Daniel T. Pihulic
Attorney, Agent, or Firm—Oltman and Flynn

[57] ABSTRACT

A signaling apparatus for generating an audible sound includes a housing containing a cylindrical chamber having two ends, an end member secured over each end, and a projectile member contained within the cylindrical chamber. The projectile member preferably has an outer diameter slightly smaller than the inner diameter of the cylindrical chamber, for limiting lateral movement of the projectile member. The end members form a water-tight seal with the housing to keep moisture out of the cylindrical chamber. The projectile member is preferably a metal ball. The end members have outer surfaces and optionally include a loop attached to the outer surface of one of the end members for receiving a cord. The housing, including the end members, is preferably made of PVC, brightly colored and fluorescent so that the apparatus can be more readily seen in murky water. A foam sleeve is preferably provided over the housing for improving the grip of a person holding the device. This foam sleeve is preferably brightly colored and florescent so that the apparatus can be more readily seen in murky water. A method of signaling a person with the above-described apparatus includes the step of shaking the apparatus back and forth generally along its longitudinal axis so that the projectile member within the cylindrical chamber strikes the end members.

11 Claims, 3 Drawing Sheets

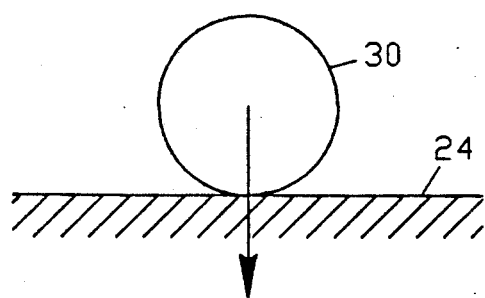
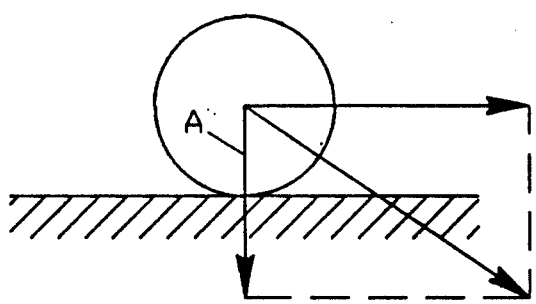
FIG. 4  FIG. 4A
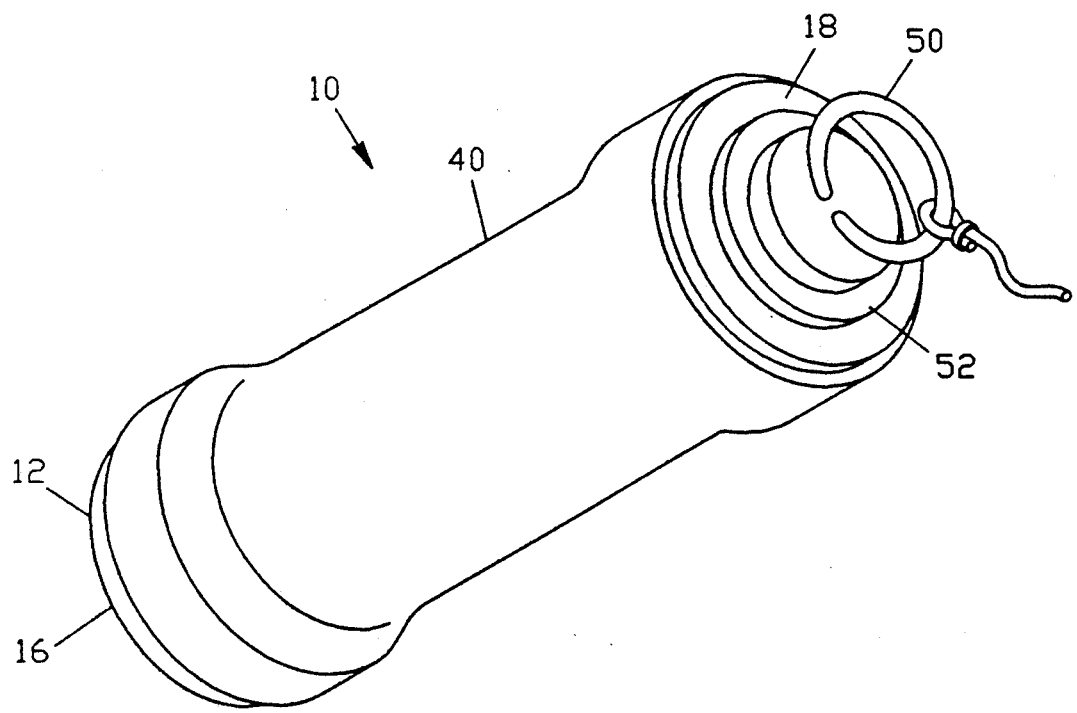
FIG. 5

UNDERWATER SIGNALING DEVICE AND METHOD

BACKGROUND OF THE INVENTION

1. Field of the Invention

The present invention relates generally to the field of rattle devices for generating sound, and more specifically to a rigid housing containing a cylindrical chamber closed by end members and containing a metal ball, for shaking back and forth along the chamber longitudinal axis so that the ball is guided to strike the end members perpendicularly for maximum impact and sound.

2. Description of the Prior Art

There have long been devices for generating various types of rattling sounds. One such device is the maraca, a percussion instrument consisting of a dried gourd containing loose pebbles for keeping rhythm in musical performances. Another is a whistle containing a ball which rattles with the air flow and trills the sound. Another is a child's toy rattler. In these and similar devices, the object is to create a particular quality rather than the maximum volume of sound. The moving projectile is typically light in weight, and thus causes a light impact on the interior walls of the device. The impact is further limited by the fact that the projectile strikes at a wide variety of random angles, often as only a glancing blow. As a result, only a fraction of the projectile's momentum is absorbed by the interior wall and converted into sound. A problem with such devices, if used for underwater signaling, is that the volume of sound generated is insufficient to signal a diver more than a few feet away.

An alternative is found in the underwater signaling device of Hart, U.S. Pat. No. 4,635,242, issued in 1987. Hart discloses a waterproof housing containing a switch-operated acoustic signal means, connected to a circuit driven by a power source. A problem with Hart is that it trades the simplicity and reliability of a manual rattling device for the unpredictability of electronics in a moist environment. In the event of an emergency, a leak in the housing may short out the circuitry or the switch may fail. Another problem is that Hart is comparatively expensive to manufacture and probably bulky.

It is thus an object of the present invention to provide an underwater signaling device which does not depend on numerous parts or electrical circuitry to function, and is thus reliable.

It is another object of the present invention to provide such a device which has the compactness and simplicity of a mechanical rattler.

It is still another object of the present invention to provide such a device which concentrates and maximizes the sound generating action of a mechanical rattler.

It is finally an object of the present invention to provide such a device which is durable and inexpensive to manufacture.

SUMMARY OF THE INVENTION

The present invention accomplishes the above-stated objectives, as well as others, as may be determined by a fair reading and interpretation of the entire specification.

A signaling apparatus is provided for generating an audible sound, which includes a housing containing a cylindrical chamber having two ends, an end member secured over each end, and a projectile member contained within the cylindrical chamber. The projectile member preferably has an outer diameter slightly smaller than the inner diameter of the cylindrical chamber, for limiting lateral movement of the projectile member. It is also preferred that the end members form a water-tight seal with the housing to keep moisture out of the cylindrical chamber. The projectile member may be a metal ball. The end members have outer surfaces and optionally include a loop attached to the outer surface of one of the end members for receiving a cord. The housing, including the end members, is preferably made of PVC and is brightly colored so that the apparatus can be more readily seen in murky water. The bright color is ideally fluorescent. A foam sleeve is preferably provided over the housing for improving the grip of a person holding the device. This foam sleeve is preferably brightly colored and fluorescent so that the apparatus can be more readily seen in murky water.

A method is also provided of signaling a person with the above-described apparatus, including the step of shaking the apparatus back and forth generally along its longitudinal axis so that the projectile member within the cylindrical chamber strikes the end members.

BRIEF DESCRIPTION OF THE DRAWINGS

Various other objects, advantages, and features of the invention will become apparent to those skilled in the art from the following discussion taken in conjunction with the following drawings, in which:

FIG. 3, when viewed together with FIG. 3a, illustrates the sound generating cycle.

FIG. 4 demonstrates with vectors that all of the momentum of the ball of the present invention is directed against the inner wall.

FIG. 4a demonstrates that only one component comprising a fraction of the momentum of the prior art ball is directed against the inner wall.

FIG. 5 is a perspective view of the signaling device having the foam sleeve feature.

DETAILED DESCRIPTION OF THE PREFERRED EMBODIMENTS

Figure 1:
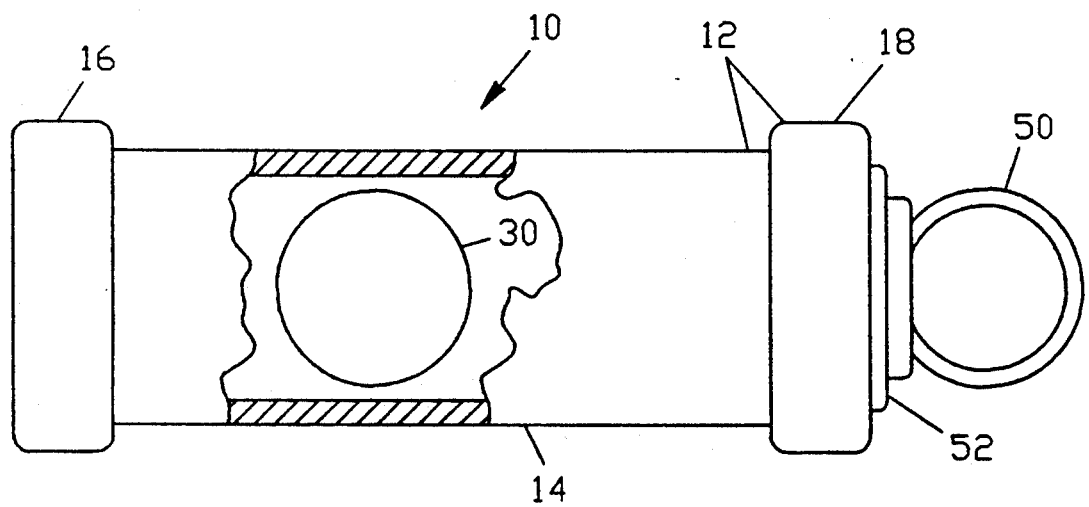
FIG. 1 is a side view of the preferred embodiment of the inventive signaling device, with a portion broken away to reveal the cylindrical interior of the housing and the ball.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

FIRST PREFERRED EMBODIMENT

Figure 2:
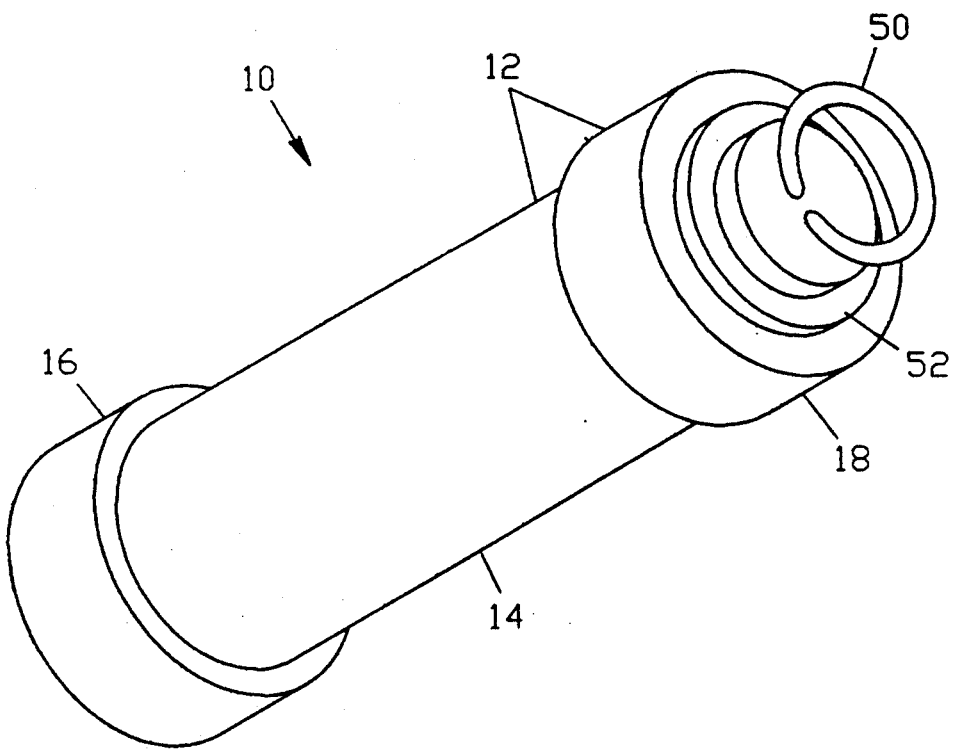
FIG. 2 is a perspective view of the signaling device without the foam sleeve feature.

Referring to FIGS. 1 and 2, a signaling device 10 is disclosed which is primarily intended for underwater use by divers. Device 10 includes a housing 12 formed of a cylindrical tube 14 fitted with end caps 16 and 18. End caps 16 and 18 are firmly secured over the ends of cylindrical tube 14 and form a water-tight seal. Interior walls 22 and 24 of housing 12 are formed by end caps 16 and 18 and are essentially perpendicular to the longitudinal axis of cylindrical tube 14.

Figure 3:
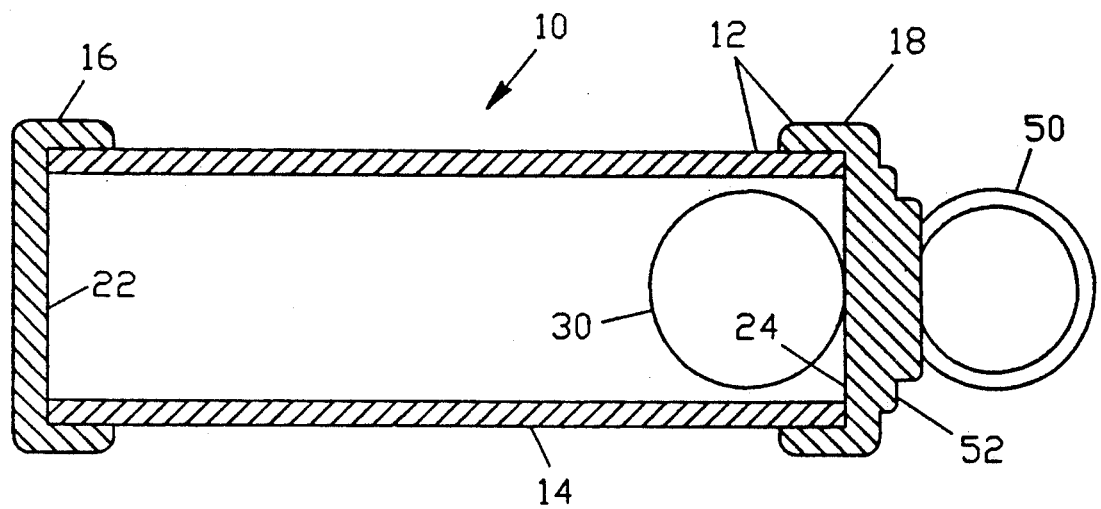
FIG. 3 is a cross-sectional side view of the signaling device showing the ball impacting the end member fitted with the optional loop.
Figure 3A:
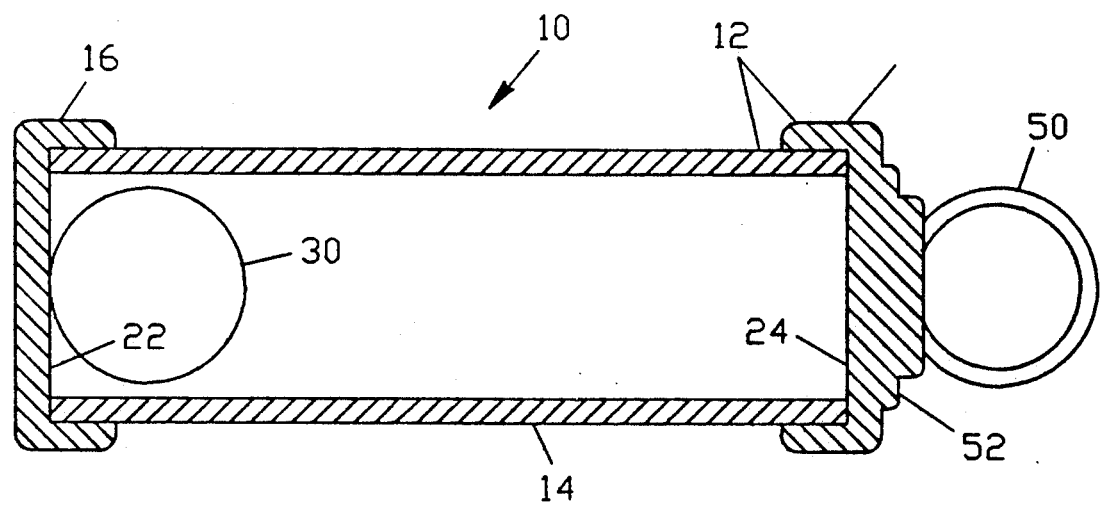
FIG. 3a is a cross-sectional side view of the signaling device showing the ball impacting the end member opposite the loop.

A projectile or ball 30 is slidably contained within housing 12 and has an outer diameter only slightly smaller than the inner diameter of cylindrical tube 14. To signal, one shakes device 10 back and forth in the general direction of its longitudinal axis. This action causes ball 30 to slide within housing 12 and alternately strike interior walls 22 and 24. See FIGS. 3 and 3a. The close fit of housing 12 around ball 30 permits device 10 to guide ball 30 in an essentially perpendicular path against interior walls 22 and 24. This important and inventive feature causes virtually all of the momentum of ball 30 to be transferred to end caps 16 and 18 and to cylindrical tube 14 because ball 30 must completely reverse direction. See FIG. 4. Prior devices typically transfer only a fraction of this momentum, identified as vector A in prior art FIG. 4a. The capture of the full momentum of ball 30 creates the maximum shock wave and vibration in housing 12, generating the greatest possible volume of sound for a given ball 30 weight and housing 12 composition.

Housing 12 is preferably made of polyvinyl chloride plastic, commonly called PVC. Other housing 12 materials are suitable if sufficiently rigid to dissipate ball 30 impact primarily as vibration and sound. Softer materials are less well suited because they dissipate the impact primarily as heat. Ball 30 is preferably made of a relatively heavy metal, such as steel. Chrome or nickel plating, or galvanization, preferably covers ball 30 to prevent corrosion. Ball 30 may alternatively be made of PVC, glass, or a lighter metal such as aluminum, but the lower mass-to-volume ratio of such materials transfers less momentum to housing 12 during use and, consequently, generates a lower volume of sound.

Housing 12 is preferably about six inches in length and about one and one half inches in outer diameter, to easily fit into the average user's hand. A prototype made to these preferred dimensions and of these preferred materials was able to generate a rattling sound underwater which could be heard at a distance of one hundred feet. Many other dimensions and choices of materials have proven suitable, however.

A soft, foam sleeve 40 preferably covers cylindrical tube 14 to give the user an improved grip underwater. See FIG. 5. Sleeve 40 is optionally dyed or painted with a bright, fluorescent color so that device 10 can more readily be found if dropped in murky water. This bright, fluorescent color may also serve, in combination with the signaling sound generated, to help a diver draw attention.

A ring or loop 50 is preferably provided on the outer side 52 of end cap 16 or end cap 18 to receive a rope or cord 54. Cord 54 can in turn be tied to a dive belt.

METHOD

In practicing the invention, the following method may be used. A diver wishing to draw the attention of another diver, if for example he is in distress, firmly shakes device 10 back and forth in the general direction of the housing 12 longitudinal axis, so that ball 30 strikes end caps 16 and 18. See FIGS. 3 and 3a. It is also contemplated that this method and this device 10 can be used to generate a signal on land.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim as our invention:

1. A signaling apparatus for generating an audible sound, comprising:
    a housing containing a cylindrical chamber having two ends,
    an end member secured over each end,
    a projectile member contained within the cylindrical chamber, and wherein the projectile member has an outer diameter no less than half the inner diameter of the cylindrical chamber.

2. A method of signaling a person with the apparatus of claim 1, comprising the step of:
    shaking the apparatus back and forth generally along its longitudinal axis so that the projectile member within the cylindrical chamber strikes the end members.

3. A signaling apparatus as in claim 1, wherein the end members form a water-tight seal with the housing, to keep moisture out of the cylindrical chamber.

4. A signaling apparatus as in claim 1, wherein the projectile member is a metal ball.

5. A signaling apparatus as in claim 1, wherein the end members have outer surfaces, additionally comprising a loop attached to the outer surface of one of the end members for receiving a cord.

6. A signaling apparatus as in claim 1, wherein the housing, including the end members, is made of PVC.

7. A signaling apparatus as in claim 1, wherein the housing is brightly colored so that the apparatus can be more readily seen in murky water.

8. A signaling apparatus as in claim 7, wherein the color is fluorescent.

9. A signaling apparatus as in claim 1, additionally comprising a foam sleeve over the housing for improving the grip of a person holding the device.

10. A signaling apparatus as in claim 9, wherein the foam sleeve is brightly colored so that the apparatus can be more readily seen in murky water.

11. A signaling apparatus as in claim 10, wherein the color is fluorescent.

* * * * *

UNITED STATES PATENT AND TRADEMARK OFFICE
CERTIFICATE OF CORRECTION

PATENT NO. : 5,187,691
DATED : February 16, 1993
INVENTOR(S) : William J. Oehme, et al.

It is certified that error appears in the above-indentified patent and that said Letters Patent is hereby corrected as shown below:

On the title page, item (76) inventor: Donald Ammann, should read
-- Donald J. Ammann --

Signed and Sealed this

Twenty-third Day of November, 1993

Attest:

BRUCE LEHMAN

Attesting Officer     Commissioner of Patents and Trademarks